Dec. 26, 1961  A. C. SCURLOCK  3,014,427
PROPELLANT GRAINS

Filed May 9, 1952  2 Sheets-Sheet 1

INVENTOR
Arch C. Scurlock

BY Martha L. Ross
AGENT

Dec. 26, 1961 A. C. SCURLOCK 3,014,427
PROPELLANT GRAINS
Filed May 9, 1952 2 Sheets-Sheet 2

INVENTOR
Arch C. Scurlock
BY Martha L. Ross
AGENT

United States Patent Office 3,014,427
Patented Dec. 26, 1961

3,014,427
PROPELLANT GRAINS
Arch C. Scurlock, Fairfax, Va., assignor to Atlantic Research Corporation, Alexandria, Va., a corporation of Virginia
Filed May 9, 1952, Ser. No. 286,990
19 Claims. (Cl. 102—98)

This invention relates to propellant grains of improved design. More specifically it relates to propellant grains designed to provide substantially constant acceleration at any desired rate for use in catapult launchers.

For optimum catapult performance it is desirable to maintain acceleration of the plane or missile constant and at a level as near as possible to the maximum allowable. The latter is an especially important factor in keeping the required launcher length at a minimum. In view of the relatively low maximum accelerations feasible for the launching of aircraft to avoid damage or personnel injury, catapult launchers require considerable length and any factor which permits shortening without sacrifice of performance is vital.

To achieve constant acceleration, substantially constant pressure should be maintained in the catapult tube. In other words, the propellant gases must be generated at a progressively increasing rate substantially equal to the increase in chamber volume resulting from the outward movement of the piston.

The object of this invention is to provide propellant grains of improved design and high progressivity which are capable of maintaining substantially constant pressure and constant acceleration at a desired level in a catapult tube.

Another object is to provide propellant grains which compensate for heat losses and gas leakage in the catapult chamber and thus maintain substantially constant pressure and constant acceleration.

Other objects and advantages of my invention will become evident from the drawings and the following description:

I have discovered that the desired rate of progressivity in the production of combustion gases to maintain substantially constant pressure in the catapult chamber is obtained when the burning surface is directly proportional to the burning distance of the propellant grain where heat losses are not considered. To compensate for appreciable heat losses and gas leakage, the burning surface should increase at a somewhat greater rate with reference to the burning distance.

To accomplish the desired progressivity I have devised propellant grains which are inhibited against combustion on all surfaces except along one edge or along a narrow surface adjacent to and including one edge or along a small surface adjacent the theoretical edge which would be formed by the extrapolation of two converging faces of the grain and which are of configuration such that the area of any section through the grain which is equidistant at all points from the uninhibited edge or surface, when measured linearly entirely within the grain structure, is proportional to an exponential value of the distance which is at least 1 and which is somewhat higher where it is desired to compensate for calculated heat losses and gas leakage. Such powder charges provide the high progressivity in the production of combustion gases necessary to compensate for rapidly increasing catapult chamber volume and thus maintain constant pressure and constant acceleration.

Any conventional and suitable method of inhibiting the surface of the grain may be employed as, for example, coating or other type of surface treatment.

Figure 1:
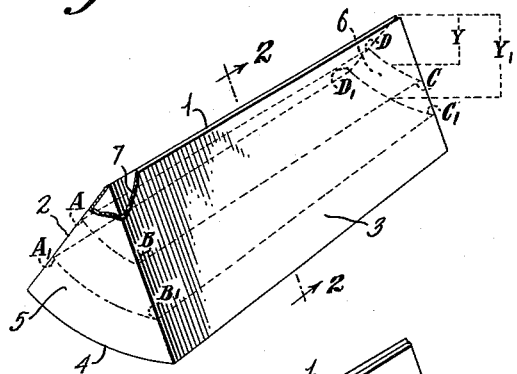
FIGURE 1 is a perspective view of a propellant grain made according to my invention.
Figure 3:
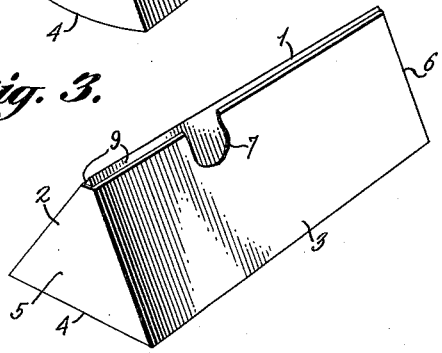
Figure 2:
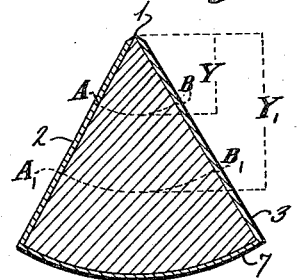
FIGURE 2 is a cross section of the grain in FIGURE 1 taken at 2—2.

In its simplest form, the grain is substantially wedge shaped with plane sides and an arcuate base as shown in FIGURES 1 and 2, in which case it comprises, in effect, a sector of a cylinder, or with plane sides and a flat base as shown in FIGURE 3. For purposes of this specification it will be understood that the term "base" refers to the face opposite the uninhibited edge or surface and the term "side" or "sides" refers to the faces which intersect at the uninhibited edge or define the uninhibited surface.

In FIGURES 1 and 2, edge 1 is uninhibited and the remaining surfaces, including sides 2 and 3, end surfaces 5 and 6, and base 4 are inhibited against combustion. A portion of the surface is cut away to show the inhibitor coating 7. When a solid propellant burns, all of the uninhibited surface recedes at the same rate. Thus at a burning distance Y the burning surface area will be ABCD and at a burning distance $Y_1$ the burning surface area will be $A_1B_1C_1D_1$. The burning surface is equidistant from the uninhibited edge at all points and, since the grain has plane sides, its area is directly proportional to the burning distance. It will be understood that the uninhibited edge is of finite width as would be required in practical production.

FIGURE 3 is inhibited on all surfaces except for edge 1 and a narrow surface 9 adjacent the edge on each side. This provides a somewhat larger initial ignition surface to compensate for initial heat losses. Although such a flat bottomed wedge may be convenient with respect to such considerations as storage, loading and the like, it is not as economical as the grain with a convex base as shown in FIGURES 1 and 2 since there will be some waste in unburned propellant material at the periphery of the base.

Figure 5:
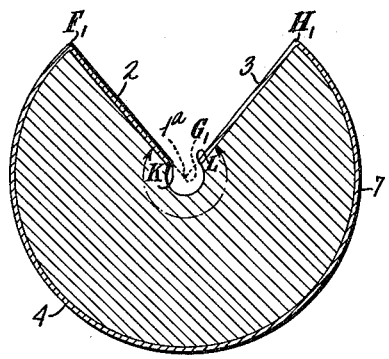
FIGURES 3, 4, 5 and 6 are perspective views showing modifications.
Figure 4:
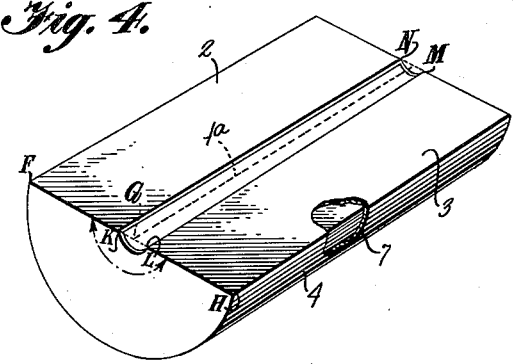

The time rate of combustion gas production for any one grain may be varied substantially as desired by increasing or decreasing the available burning surface per unit of burning distance. This is accomplished by increasing or decreasing the angle of convergence of the sides which define the uninhibited edge or surface. FIGURE 4 shows a sector of a cylinder with the radial faces 2 and 3 converging at an angle FGH of 180°. In FIGURE 5 the sector is expanded to include an obtuse angle $F_1G_1H_1$.

Figure 6:
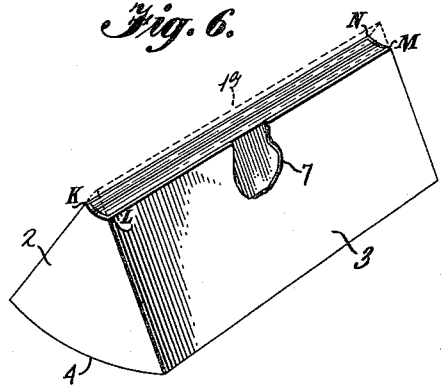

The initial heat losses in catapults as presently designed, due to factors such as heating of the combustion chamber, radiation and the like, are usually of sufficient magnitude to make desirable the provision of a somewhat larger initial ignition surface than that provided by an uninhibited edge. Furthermore, in commercial production, it is difficult to produce a grain inhibited against combustion on all of its surfaces except for a thin edge. For practical purposes of manufacture it is generally most feasible to apply a protective coating to a small surface area, as in FIGURE 3, which is stripped off after the inhibitor treatment or to inhibit the entire grain and then to shave off or otherwise remove the appropriate edge to form a narrow uninhibited surface closely adjacent to the removed edge as shown in FIGURE 6, where KLMN defines the uninhibited surface and $1a$ is the theoretical edge formed by convergence of faces 2 and 3.

The flat sided propellant grains hitherto discussed present burning surface areas which are directly proportional to the burning distance and provide combustion gases at a rate sufficient to fill the expanding catapult chamber volume at a constant pressure if heat losses are negligible. However, in normal operation with available catapults there are appreciable heat losses due to convection and radiation factors and there may also be some gas leakage. It is advisable to increase progressively the burning surface area relative to the burning distance to produce sufficiently larger masses of combustion gases to offset such losses.

The desired compensation for heat losses and gas leakage is accomplished by adding propellant material to the sides which form the uninhibited edge or surface along a predetermined curve to form, in effect, concave sides. The actual degree of curvature is, of course, determined by the specific conditions of heat loss and gas leakage in a given type of catapult. In any case, the burning surface area varies directly with the burning distance raised to a power which is greater than 1. In general, depending upon the heat loss and gas leakage requirements of a particular type of catapult, it will be necessary to increase the ratio of burning surface area to burning distance as burning progresses. In most cases, it will not be necessary to increase this exponential value above about 2. But in special instances where there is unusually high heat loss or gas leakage, it may be desirable to design the grain so that the exponential value is higher than 2.

Figure 7:
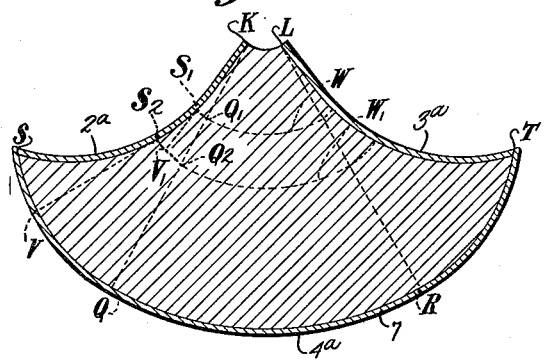
FIGURES 7, 8, 9 and 10 are cross sections showing still other modifications.

FIGURE 7 shows a grain with concave sides $2a$ and $3a$ which provide compensation for heat losses and gas leakage in portions KSQ and LRT where KL is the uninhibited ignition surface.

Since all of the uninhibited surface of the burning propellant recedes at the same rate, the burning distance, as measured linearly along concave sides KS and LT, is equal to that measured along straight radical planes KQ and LR which are tangent to curved sides KS and LT at K and L respectively. In other words, the burning distance $KS_1$ to the burning surface W is equal to the burning distance $KQ_1$ and the burning distance $KS_2$ to the burning surface $W_1$ is equal to the burning distance $KQ_2$. Within the peripheral portions of the grain between the concave sides and the radial planes tangent to the concave sides at the uninhibited surface, the burning distance at any given point of the burning surface equals the length of a straight line drawn from said point to a point of tangency with the concave face of the grain plus the linear distance from this point of tangency along the concave face to the uninhibited edge. Thus the burning distance $KV_1$ equals the sum of $KS_1$ plus $S_1V_1$, which is tangent to KS at $S_1$, and the burning distance $KV_1$ equals the burning distance $KQ_2$. Similarly burning distance KV equals the sum of $KS_2$ plus $S_2V$, the latter being tangent to KS at $S_2$, and equals the burning distance KS and KQ. It will be seen, therefore, that the burning distance at any point of the burning surface is a linear distance measured entirely within the grain structure and equals the burning distance at any other point of the burning surface.

Figure 8:
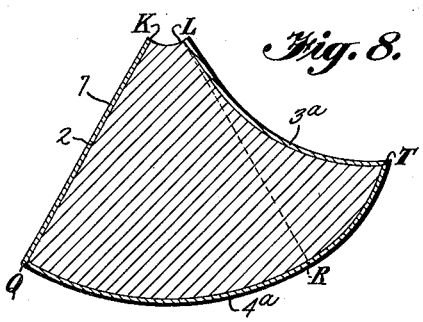

The portion of the burning surface peripheral to the radial plane which is tangent to the concave face at the uninhibited surface involutes. As seen in FIGURE 7, the degree of curvature of the burning surface $W_1$ increases from $Q_2$ to $S_2$ and the degree of curvature of the burning surface $4a$, which is also the base of the grain, increases from Q to S.

Where heat losses are minor it may be sufficient to provide only one concave side as shown in FIGURE 8 where face $3a$ is the concave side and LRT defines the portion of the grain which compensates for heat loss and gas leakage.

Figure 9:
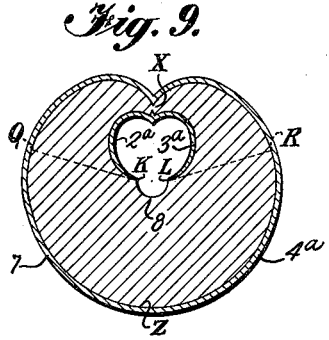

FIGURE 9 shows a cross section of an obtuse angled grain designed to compensate for heat losses and gas leakage which is inhibited on all surfaces, including faces $2a$ and $3a$, except for broached ignition surface 8. The curvature of concave faces $2a$ and $3a$ brings their base edges into contact and they are integrally united at X as shown.

Figure 10:
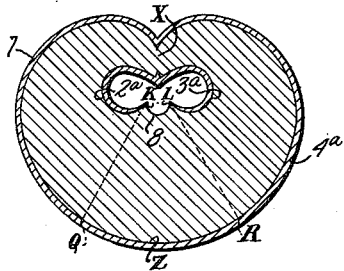

FIGURE 10 shows, in cross section, an acute angled grain designed for use where heat losses and gas leakage are especially high. As in the case of FIGURE 9, the curvature of concave faces $2a$ and $3a$ brings their base edges into contact where they are integrally united at X.

In both FIGURES 9 and 10, base $4a$ involutes peripherally of segment QZR for reasons aforedescribed. The positions of Q and R are defined by radial planes tangent to curved sides $2a$ and $3a$ at the ignition surface, namely at K and L.

Involution of the base of grains designed to compensate for heat losses is not essential to the proper functioning of the propellant. It is important largely from the point of view of substantially complete utilization of the propellant material with consequent economy of operation. By designing the grain so that its base corresponds substantially with the desired final burning surface, any appreciable waste in excess unburned material is avoided. However, if factors such as ease of manufacture, ease of handling or the like outbalance possible losses due to excess, unburned propellant material, the base may be given any desired configuration so long as the rest of the structure is properly designed so as to give the required progression in burning surface area.

In practice the total pressure and acceleration obtained by use of the aforedescribed propellant grains is greatly increased by the simultaneous combustion of a relatively large number of grains. It is frequently advantageous to unite integrally several of the individual units at their bases to form a single composite propellant grain. Although several composite grains will generally be necessary, the total number of individual units which require handling is reduced. The composite grains are also stronger than the individual units. Since the base of each unit is no longer an exterior surface, there is a considerable saving in inhibitor.

Figure 11:
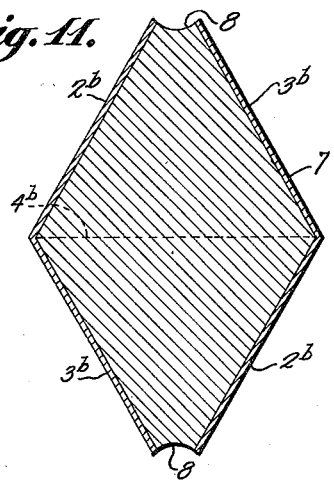
FIGURES 11, 12 and 13 are cross sections showing composite grains comprising a plurality of integrally joined propellant grain units made according to my invention.

Each of the joined units burns independently of the others and the total combustion gases produced is the sum of that produced by each of the individual units combined to form the composite grain. FIGURE 11 shows two wedge shaped grain units integrally united at their bases $4b$, with each unit retaining its small ignition surface 8 and inhibited sides $2b$ and $3b$.

Figure 12:
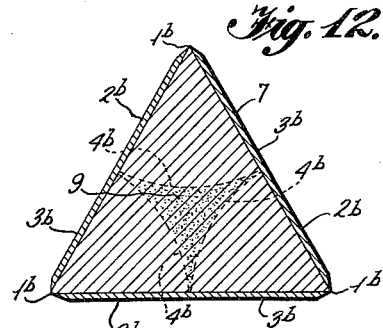
Figure 13:
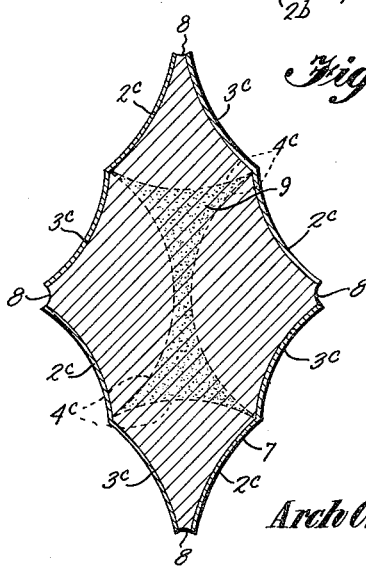

In FIGURE 12, 3 units are integrally joined at their bases $4b$ by a core of propellant grain material 9. Each unit retains its uninhibited ignition edge $1b$. The remaining surfaces are inhibited against combustion. FIGURE 13 is a cross sectional view of a composite propellant grain comprising 4 units integrally united at their bases $4c$ by core material 9, each unit having an uninhibited ignition surface 8. Inhibited surfaces $2c$ and $3c$ are concave to compensate for heat losses and gas leakage. It will be understood that the individual units of any composite grain may be formed with sides of predetermined curvature to compensate for calculated heat losses and gas leakage and with initial ignition surfaces or edges as desired.

The core of propellant material uniting the bases of the individual units is generally left as an unburned residue after combustion. However, this waste is, in many cases, more than compensated for by the advantages of the composite grain.

It will be understood that conventional igniter and booster charges may be employed with these grains either as separate charges or attached to the grain at the uninhibited surface in any desired way.

Although this invention has been described with reference to illustrative embodiments thereof, it will be apparent to those skilled in the art that the principles of this invention may be embodied in other forms, but within the scope of the appended claims.

I claim:
1. A propellant grain which is inhibited against combustion on all surfaces except along one edge and which is of such configuration that the area of any section through said grain, said section being equidistant at all points from the uninhibited edge, said distance being a linear function entirely within the grain structure, is proportional to an exponential value of the distance from the uninhibited edge which is at least 1.

2. A propellant grain which is inhibited against combustion on all surfaces except along one edge and which is of such configuration that the area of any section through the grain, said section being equidistant at all points from the uninhibited edge, is directly proportional to the distance from the uninhibited edge.

3. A propellant grain which is inhibited against combustion on all surfaces except along a surface bounded on two opposite sides by converging faces, said uninhibited surface being adjacent to and coextensive throughout its length with the theoretical line of intersection of said two converging faces, and which is of such configuration that the area of any section through said grain, said section being equidistant at all points from the uninhibited surface, said distance being a linear function entirely within the grain structure, is proportional to an exponential value of the distance from the uninhibited surface which is at least 1.

4. A propellant grain which is inhibited against combustion on all surfaces except along a narrow surface adjacent to and including one edge, said uninhibited surface being coextensive with said uninhibited edge, and which is of such configuration that the area of any section through said grain, said section being equidistant at all points from said uninhibited surface, said distance being a linear function entirely within the grain structure, is proportional to an exponential value of the distance from the uninhibited surface which is at least 1.

5. A propellant grain which is inhibited against combustion on all surfaces except along one edge and which is of such configuration that the area of any section through said grain, said section being equidistant at all points from the uninhibited edge, said distance being a linear function entirely within the grain structure, is proportional to an exponential value of the distance from the uninhibited edge which is at least 1 and up to about 2.

6. A propellant grain which is inhibited against combustion on all surfaces except along a surface bounded on two opposite sides by converging faces, said uninhibited surface being adjacent to and coextensive with the theoretical line of intersection of said two converging faces, and which is of such configuration that the area of any section through said grain, said section being equidistant at all points from the uninhibited surface, is directly proportional to the distance from the uninhibited surface.

7. A wedge shaped propellant grain which is inhibited against combustion on all surfaces except along one edge.

8. A propellant grain which comprises a sector of a cylinder and which is inhibited against combustion on all surfaces except along the edge opposite the arcuate base.

9. A substantially wedge shaped propellant grain which is characterized by two converging concave sides and which is inhibited against combustion on all surfaces except along a surface adjacent to and coextensive with the theoretical line of intersection of said two converging, concave sides.

10. A propellant grain which comprises substantially a sector of a cylinder characterized by two converging concave sides and which is inhibited against combustion on all surfaces except along a narrow surface adjacent to and coextensive with the theoretical line of intersection of said 2 converging concave sides.

11. A propellant grain which comprises a sector of a cylinder, the radial sides of which include an obtuse angle, and which is inhibited against combustion on all surfaces except along the edge opposite the arcuate base.

12. A propellant grain which comprises substantially a sector of a cylinder characterized by two converging concave sides, said converging concave sides including an obtuse angle, and which is inhibited against combustion on all surfaces except along a surface adjacent to and coextensive with the theoretical line of intersection of said two converging concave sides, said edge being opposite the convex arcuate base.

13. A propellant grain which is inhibited against combustion on all surfaces except along a surface bounded on two opposite sides by converging faces, said uninhibited surface being adjacent to and coextensive with the theoretical line of intersection of said two converging faces, said converging sides including an acute angle and an arcuate base.

14. A propellant grain which is inhibited against combustion on all surfaces except along a surface bounded on two opposite sides by converging faces, said uninhibited surface being adjacent to and coextensive with the theoretical line of intersection of said two converging faces, said converging faces being concave and including an acute angle and a convex base.

15. A propellant grain as defined in claim 14, wherein said concave sides are integrally united at their base ends.

16. A propellant grain which is inhibited against combustion on all surfaces except along a surface bounded on two opposite sides by converging faces, said uninhibited surface being adjacent to and coextensive with the theoretical line of intersection of said two converging faces, said converging faces being concave and including an obtuse angle and a convex base.

17. A propellant grain as defined in claim 16, wherein said concave sides are integrally united at their base ends.

18. A composite propellant grain comprising a plurality of propellant grain units, each of said units being inhibited against combustion on all surfaces except along one edge and characterized by a configuration such that the area of any section through said unit, said section being equidistant at all points from said uninhibited edge, said distance being a linear function entirely within the grain structure, is proportional to an exponential value of the distance from said uninhibited edge which is at least 1 and each of said units being in integral and continuous union along its base with each other of said units, said base comprising the face of each unit opposite the uninhibited edge.

19. A composite propellant grain comprising a plurality of propellant grain units, each of said units being inhibited against combustion on all surfaces except along a surface bounded on two opposite sides by converging faces, said uninhibited surface being adjacent to and coextensive with the theoretical line of intersection of said two converging faces, and characterized by a configuration such that the area of any section through said unit, said section being equidistant at all points from said uninhibited surface, said distance being a linear function entirely within the grain structure, is proportional to an exponential value of the distance from the uninhibited surface which is at least 1 and each of said units being in integral and continuous union along its base with each other of said units, said base comprising the face of each unit opposite the uninhibited edge.

References Cited in the file of this patent

UNITED STATES PATENTS

| | | |
|---|---|---|
| 273,209 | Wiard | Feb. 27, 1883 |
| 622,777 | McGahie | Apr. 11, 1899 |
| 1,454,414 | Skilling | May 8, 1923 |
| 2,643,611 | Ball | June 30, 1953 |

FOREIGN PATENTS

| | | |
|---|---|---|
| 437,228 | France | Feb. 12, 1912 |